Aug. 13, 1940.　　　C. W. BUCKHAM　　　2,211,714
CAMERA
Filed Feb. 17, 1939　　　3 Sheets-Sheet 1

WITNESSES

INVENTOR
Charles W. Buckham
BY
ATTORNEYS

Aug. 13, 1940. C. W. BUCKHAM 2,211,714
CAMERA
Filed Feb. 17, 1939 3 Sheets-Sheet 2
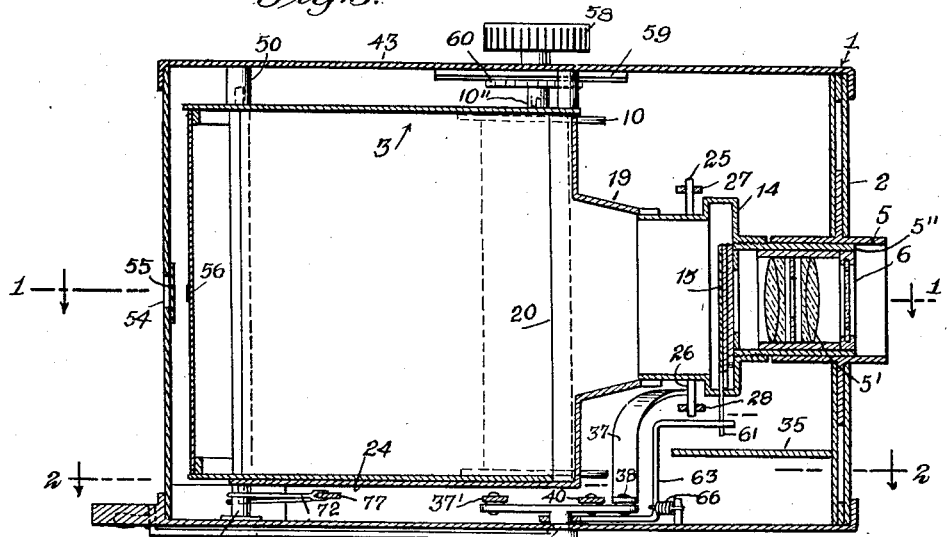
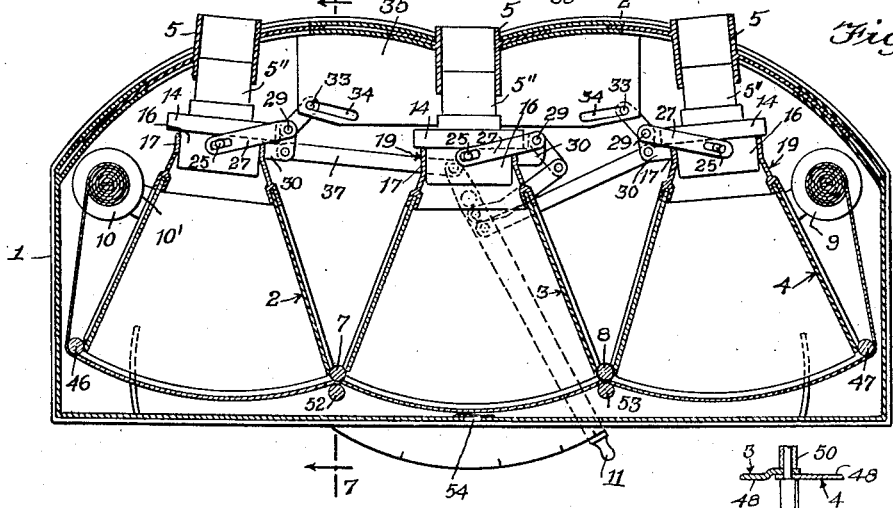
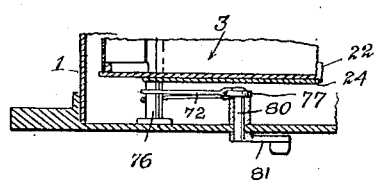
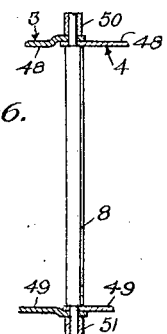
INVENTOR
Charles W. Buckham
BY
Munn, Anderson & Liddy
ATTORNEYS Aug. 13, 1940.   C. W. BUCKHAM   2,211,714
CAMERA
Filed Feb. 17, 1939   3 Sheets-Sheet 3
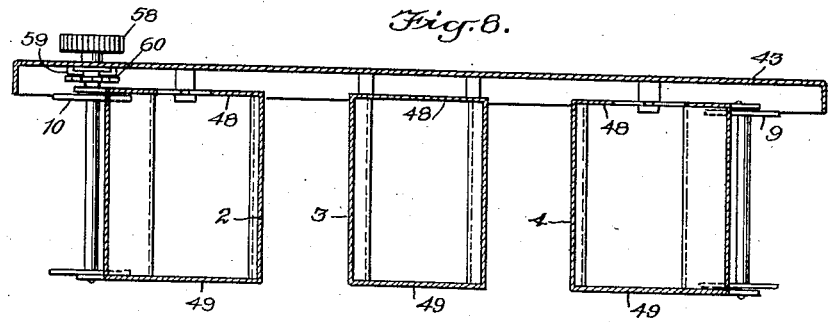
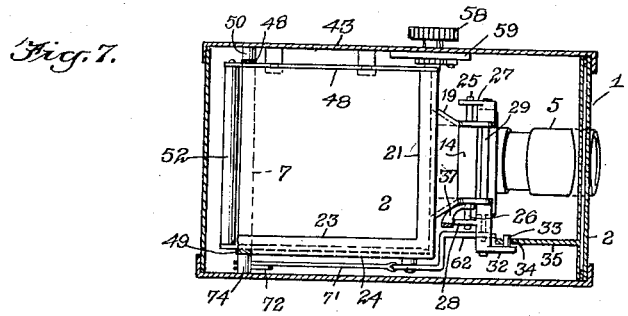
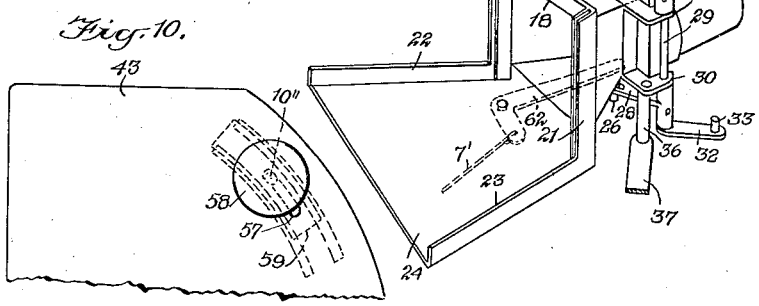
INVENTOR
Charles W. Buckham Patented Aug. 13, 1940

2,211,714

UNITED STATES PATENT OFFICE 2,211,714

CAMERA

Charles W. Buckham, Scarsdale, N. Y.

Application February 17, 1939, Serial No. 256,835

3 Claims. (Cl. 95—2)

This invention relates to cameras and particularly to an improved camera for focusing a plurality of camera units on a single object at the same time, the structure being such that a section of a single film is presented for exposure in each of the units when the camera is in use.

An additional object is to provide a camera having a plurality of camera units with one stationary unit and swinging units on each side thereof arranged to function at any desired angle between the swinging units and the stationary unit to secure desired stereoscopic effects.

Another object of the invention is to provide a camera having multiple units for securing colored photographs, the same utilizing standard roll films or films having zones sensitive to the three primary colors.

An additional object is to provide a camera formed with focusing means and an improved lever for actuating said focusing means by swinging the lever from one position to the other.

In the accompanying drawings—

Fig. 3 is a transverse sectional view through Fig. 1 approximately on the line 3—3;

Fig. 4 is a view similar to Fig. 1 but showing the camera units swung to the opposite extreme position;

Fig. 5 is a detail fragmentary sectional view illustrating certain parts of the unit actuating mechanism;

Fig. 6 is a fragmentary sectional view through Fig. 1 approximately on the line 6—6;

Fig. 7 is a sectional view through Fig. 4 approximately on the line 7—7;

Fig. 8 is a sectional view through Fig. 1 approximately on the line 8—8, illustrating that part of the mechanism which is adapted to be removed from the camera when reloading the camera;

Fig. 9 is a perspective view of the lens-carrying tube, focusing mechanism and associated parts;

Fig. 10 is a fragmentary top view of part of the structure shown in Fig. 7, illustrating the manually actuated thumb member for winding the film;

Fig. 11 is a diagram illustrating how the various camera units may be automatically and quickly focused on objects at different distances;

Fig. 12 is a plan view of a short portion of a special film.

Figure 1:
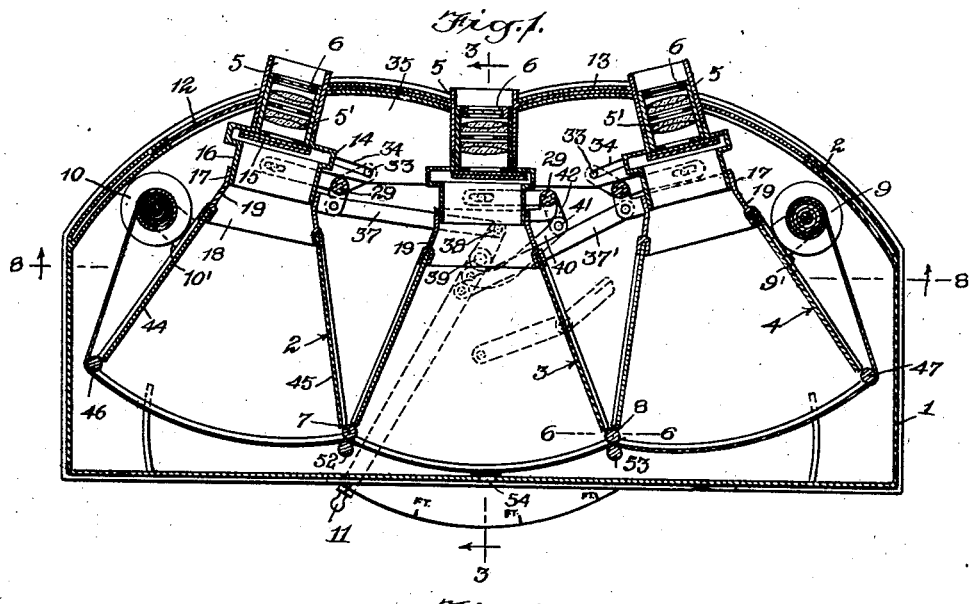
Fig. 1 is a sectional view through Fig. 3 approximately on the line 1—1, the same illustrating an embodiment of the invention.

As illustrated in the accompanying drawings, 1 indicates a casing which may be of wood or other suitable material. Arranged within this casing are camera units 2, 3 and 4. Each of these units is provided with a tubular member 5 carrying a color screen 6, which may be readily removed, and the usual lens 5'. The three camera units are connected together by pivot pins 7 and 8, which also act to guide the film in its movement from the fresh spool 9 to the exposed spool 10. The unit 3 is always stationary and is aimed directly ahead, while the units 2 and 3 may be swung back and forth upon the actuation of the hand lever 11.

According to the disclosure in the drawings, Fig. 1 shows the units focused on an object as close to the camera as a proper focus can be secured. Fig. 4 shows the units 2 and 4 swung so as to focus on an object at some distance from the camera, as for instance fifty or one hundred feet. If desired, the mechanism for swinging the units 2 and 4 could be arranged to swing these units so that the tubular members 5 thereof will be parallel to the tubular member of the unit 3. The casing 1 is made double at the front so that the sliding plates 12 and 13 may freely slide back and forth. These plates are rigidly connected with the tubular members 5 of units 2 and 4 and as these units swing on the pins 7 and 8 the arc of plates 12 and 13 will be made accordingly. As all the tubular members 5 are identical and the associated parts are identical, a description of one will apply to all.

As illustrated in Figs. 1 and 4, tubular member 5" connects with an enlargement 14 in which the shutter 15 is arranged. The enlargement 14 merges into a tubular section 16 which slidingly fits into the end section 17 of a frame 18. This frame, as shown in Fig. 9, is provided with a converging part 19 merging into the upstanding bifurcated walls 20 and 21. These walls merge into the respective upstanding flanges 22 and 23 of the base 24. Pins 25 and 26 extend outwardly from the tubular member 16 and slotted levers 27 and 28 fit thereover. Both of these levers are rigidly secured to a shaft 29 pivotally mounted in extensions 30 and 31. A link 32 is rigidly secured to shaft 29 and is provided with a pin 33 extending through a slot 34 (Fig. 1) in a cam plate 35 which is rigidly secured to the casing. A pin 36 (Fig. 9) is pivotally connected with a link 37, which link has one end pivotally connected at 38 to the hand lever 11, which hand lever is pivotally connected at 39 on the frame 1. Therefore, it will be seen that when lever 11 is swung toward the right in Fig. 1, link 37 will be moved substantially to the left and will thereby swing the entire unit 2 on its pivot pin 7. As the unit swings, the pin 33 acting in slot 34 will gradually swing the link 32 and shaft 29 for moving the lens inwardly or outwardly to secure the desired focus. This movement, of course, includes the tubular member 5 and the section 16. The parts are proportioned to secure this result automatically.

As the unit 2 swings to the left from the position shown in Fig. 1, the focal distance will become greater and greater, and the slot 34 and associated parts are proportioned to take care of this variation in focal length so that whenever the unit stops it will be in focus with the object at which it is aimed. The unit 4 will act in a similar manner to unit 2. Unit 3 will not swing but the tubular member 5 and associated parts will move inwardly and outwardly so as to vary the focus to the same extent as the other two units and simultaneously therewith. The lever 11 is connected at the same distance on each side of the pivotal mounting 39 to the respective links 37 and 37' but at a different point it is connected to the lever 40 which is pivotally connected at 41 to a link 42 which is connected to the rod 29 of the focusing mechanism.

By reason of the above-mentioned construction, the focusing mechanism of all the units will function simultaneously and at the same time. It will be evident, however, that if desired links 37 and 37' could be eliminated or temporarily removed and then only the center unit 3 would function. By removing the color screen 6 from this central unit, the unit would function as an ordinary film camera with a quick focusing mechanism. Preferably the respective screens 6 are such as to screen out all but red, blue and yellow. For instance, the unit 2 could be sensitive to red, unit 3 sensitive to blue, and unit 4 sensitive to yellow. In this way three separate films of the same object would be secured and the picture would be stereoscopic. After these negatives have been taken, the usual process for producing colored prints would be carried out.

It will be noted from Fig. 1 that the fresh film spool 9 is mounted on suitable brackets 9' carried by the section 4 while the exposed film spool 10 is mounted on brackets 10' which is secured to the unit 2.

The casing 1 is provided with a cover 43, as shown in Fig. 8, and this cover carries the respective walls 44 and 45 of the various units. These walls have one edge slidably fitting in the walls 20 and 21 (Fig. 9) so that these walls may rest on the base 24 when the parts are in fully functioning position. The pins 46 and 47, as well as pins 7 and 8, all act as rollers and are rotatably mounted in the top and bottom plates 48 and 49, as indicated particularly in Fig. 6. As shown in this figure, these pins all rotate as they have pintle members 50 and 51 rotatably extending through the respective top and bottom walls 48 and 49. In addition there are provided rollers 52 and 53 (Fig. 1) which are carried by the top and bottom walls 48 and 49 which hold the film in place as the film moves over rollers 7 and 8.

It will be evident that when the camera is working in the usual way, there are three exposures at one time and then the spool 10 must be rotated until all the units are provided with new exposures. Preferably the film is numbered in groups of three and when a number is opposite the center of unit 3 all exposure sections or zones of the film will be in proper position. As shown in Fig. 3, there is provided a window 54 having a red glass or member 55, so that when the number on the film indicated by 56 (Fig. 3) comes opposite this window the cameraman realizes that he has a new film for each of his units. A stem 10" extends from the spool 10 through a suitable slot 57, as shown in Fig. 10, and is secured to the thumb member 58, whereby the spool 10 may be readily actuated. A sliding plate 59 is connected with the stem 10" so as always to maintain a light-tight connection as the unit swings back and forth. The sliding plate 59 is supported by suitable runways 60, as shown particularly in Figs. 6 and 10. The same construction is provided with spool 9 so as to take care of the back-and-forth swinging movement of the unit 4 as it is moved to different focusing positions.

When the camera is to be reloaded, the cover 43 is raised bodily upwardly and carries with it the various walls 44 and 45 of the respective units and also the top and bottom plates 48 and 49 together with all of the rollers. The construction shown in Fig. 9 remains in the casing and also the lever 11 and associated parts, as well as the shutter-actuating mechanism hereinafter fully described. After the parts have been removed as shown in Fig. 8, the exposed film is removed and a new film provided. After the parts have been replaced the thumb member 58 is rotated until the first number is opposite the window 54. The camera is then ready for use.

Figure 2:
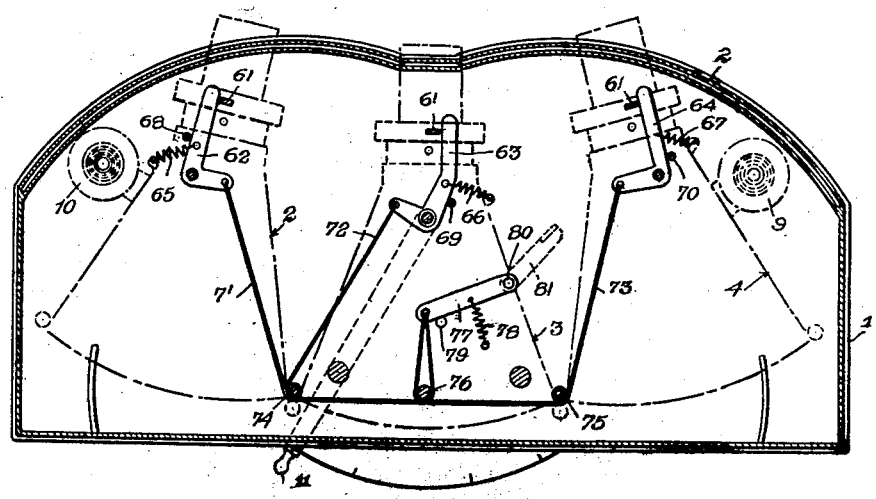
Fig. 2 is a view partly in diagram and partly in section illustrating the shutter actuating mechanism.

In regard to the shutter mechanism, it is to be understood that any suitable or desired shutter mechanism may be used, provided each shutter is provided with a pin or small bar 61, as shown in Fig. 2. The various bell crank levers 62, 63 and 64 act on these pins to swing them to a functioning position. The respective springs 65, 66 and 67 act to pull these bell crank levers back to their starting or non-functioning position, which is illustrated in Fig. 2. The respective pins 68, 69 and 70 limit the return movement of these levers. These levers are connected, respectively, to the cables 71, 72 and 73, which cables pass over the respective rolls 74 and 75 and then over the roller 76. From roller 76, these cables extend to a lever 77 to which they are secured at one end. A retractile spring 78 holds lever 77 against a stop 79. Lever 77 is connected to a shaft 80 which extends to a position exterior of the casing 1 and has a hand lever 81 rigidly secured thereto, as shown in Fig. 5. When the hand lever is pushed or pulled in a certain direction, the cables will all be pulled against the action of the springs 65, 66, 67 and 68. This will cause the shutter mechanism to function. Upon the release of the lever 81, these springs will move the parts back automatically to their starting point ready for a second actuation.

The camera can be used with the special film shown in Fig. 12. This film is provided with sections 80, 81 and 82 which are sensitive, respectively, to red, yellow, and blue rays. These sections are arranged in a plurality of zones with three sections in each zone. By using this film the various color screens 6 are not necessary. With this type of film the camera is used in the usual way as heretofore described and when all of the film has been exposed it is removed and developed and fixed in the usual way.

I claim:

1. A camera for taking colored pictures including three camera units arranged in a row, the center unit being fixed and the side units being mounted to have their rear ends swingable toward and from the center unit whereby all units may be aimed simultaneously at objects at different distances from the camera, each of said units having a shutter mechanism, a lens and a color screen; a mechanism for swinging the side units and simultaneously setting the focus of all three units so that all units will be focused correctly on the same object at the same time, a single film extending across all of said units and presenting an exposure zone for each unit, means for simultaneously actuating the shutters of the units so as to provide simultaneously three exposures of the same object, and manually actuated means for shifting the film so that the exposed parts will be moved away from the three units and unexposed parts of the film will be moved into functioning position with respect to the three units.

2. A camera including a stationary camera unit, a pair of swingable camera units, all of said units being formed identical in structure, each unit being provided with a lens and sliding means for carrying said lens so that the lens may be moved back and forth to secure a desired focus, a pivotally mounted lever for moving said sliding means back and forth, a single hand-actuated lever for actuating all of the first-mentioned levers simultaneously, means actuated by the hand-actuated lever for swinging two of said camera units in proportion to the movement of the focusing mechanism whereby all units will be aimed at the same object and brought into focus at the same time, each of said units having a shutter, and a member for causing said shutters to function.

3. A camera having a central stationary camera unit, an auxiliary camera unit on each side of the stationary unit, means for swingably mounting said auxiliary camera units adjacent the respective rear edges of the stationary camera unit, each of the camera units being provided with a lens and sliding means carrying said lenses so that the lenses may be moved back and forth for focusing purposes, means for guiding a film to a position at the rear of the respective camera units so that the sensitized side will face the lenses in the respective camera units, a pivotally mounted primary lever for each of said sliding means for moving the sliding means back and forth, a single pivotally mounted hand-actuated lever pivotally attached to the primary levers for actuating the respective sliding means and simultaneously swinging said auxiliary camera units in proportion to the sliding movement of the sliding means, whereby all three camera units will be brought into focus and aimed at the same object at the same time.

CHARLES W. BUCKHAM.